United States Patent
Dominguez

[11] Patent Number: 6,035,898
[45] Date of Patent: Mar. 14, 2000

[54] TEMPORARY PIPELINE PLUG

[76] Inventor: Jose F. Dominguez, 3591 Monica Ave., Long Beach, Calif. 90808

[21] Appl. No.: 08/044,923

[22] Filed: Apr. 8, 1993

Related U.S. Application Data

[63] Continuation of application No. 07/770,565, Oct. 3, 1991, abandoned.

[51] Int. Cl.[7] .................................................. F16L 55/11
[52] U.S. Cl. .............................................. 138/89; 138/90
[58] Field of Search .......................... 138/89, 90; 411/27, 411/34, 49; 220/235–7

[56] References Cited

U.S. PATENT DOCUMENTS

| | | | |
|---|---|---|---|
| 551,598 | 12/1895 | O'Connor | 138/90 |
| 1,808,411 | 6/1931 | Hinkston | 220/236 |
| 2,375,995 | 5/1945 | Kaeser | 220/236 |
| 2,475,748 | 7/1949 | Leroy | 138/90 |
| 2,559,210 | 7/1951 | Bradley | 138/90 |
| 2,824,577 | 2/1958 | Grunsky | 138/90 |
| 3,483,894 | 12/1969 | Finocchiaro | 138/90 |
| 3,704,729 | 12/1972 | Tomlinson | 138/90 |
| 3,889,714 | 6/1975 | Wilger et al. | 138/89 |
| 4,178,967 | 12/1979 | Streich | 138/89 |
| 4,381,800 | 5/1983 | Leslie | 138/90 |
| 4,494,584 | 1/1985 | Rognomi | 138/89 |
| 4,848,406 | 7/1989 | Stauner et al. | 138/89 |
| 5,024,079 | 6/1991 | Dufort | 138/90 |
| 5,092,367 | 3/1992 | Gilleland | 138/90 |

FOREIGN PATENT DOCUMENTS

| | | | |
|---|---|---|---|
| 0058053 | 1/1891 | Germany | 138/91 |
| 0003477 | of 1875 | United Kingdom | 138/91 |
| 0002341 | of 1887 | United Kingdom | 138/91 |

*Primary Examiner*—James F. Hook
*Attorney, Agent, or Firm*—Roy A. Ekstrand

[57] ABSTRACT

A temporary pipeline plug includes a cylindrical outer shaft defining an interior passage which receives and supports an interior shaft. A pair of pressure plates are adjustably supported at one end of the inner and outer shafts and captivate an expandable resilient member therebetween. The expandable member is expanded by compressive force between the pressure plates created by relative rotation of the inner shaft with respect to the outer shaft. A multiply spoked anchor is secured to the opposite end of the outer shaft and an intermediate support member is rotatably supported upon the outer shaft to provide a safety support for the pipeline plug when installed.

6 Claims, 3 Drawing Sheets

TEMPORARY PIPELINE PLUG

This application is a continuation of application Ser. No. 07/770,565, filed Oct. 3, 1991, now abandoned.

FIELD OF THE INVENTION

This invention relates generally to pipeline systems and particularly to temporary pipeline plugs used in the repair and system work thereon.

BACKGROUND OF THE INVENTION

Pipeline systems are extremely pervasive and found virtually in any area of the world. Their uses are varied and adapted to suit the particular system needs and geographic area served. However, in general, pipeline systems include extremely long often varied pipelines formed together with a plurality of pumps and valve networks to form a complex pipeline system. The liquids commonly transferred by such pipeline systems are often flammable and produce gases which are explosive in nature. Common examples of pipeline systems include those carrying oil or other petroleum products, industrial liquid systems, or chemical industrial processing systems. In all pipeline systems, a need arises from time to time to perform either maintenance or repair work or system alteration upon existing pipelines. In such case, it is necessary to cut into a pipeline system and produce open ends of the pipelines to perform the desired work. The presence within the system of the above-mentioned flammable liquids and explosive gases create a hazardous environment in and around any open pipeline. To minimize or reduce the danger associated with operations near and upon such open pipelines, practitioners in the art are usually required to temporarily plug or seal the open ends of the pipeline systems. The reliable maintenance of such temporary seals or plugs is made all the more difficult due to the tendency of such pipelines to develop gas pressures or vacuums within the confined system near the temporary plug or seal. In addition, because the pipeline systems are usually dynamic, ongoing processes including the interaction of other pipelines, temperature effects, and the volatile nature of the liquids within the system cause the existing pressures or vacuums to which the sealing temporary plug is subjected to vary. Thus, any temporary seal or plug secured to an open pipeline must be capable of simultaneously resisting both pressure increases and decreases as well as the creation of substantial vacuums within the system. Thus, improperly installed or improperly designed or unreliable sealing plugs may, in the presence of extreme gas pressure, be blown from the open pipe end creating extreme hazard and releasing explosive gases. On the other hand, during high vacuum, such plugs may be drawn into the system and carried substantial distances within the pipeline rendering them difficult to locate and retrieve.

In addition to the need for such temporary seal plugs to resist both vacuum and pressure, their structures must accommodate and interfere to a minimum with the ongoing work performed upon the pipeline open end. In many operations, the pipeline end must be precision cut to facilitate its reunion with the existing system using techniques such as precision welding or the like. Thus, in a typical pipeline repair or modification operation, an initial portion of the existing pipeline is cut and removed leaving to open end portions. A temporary plug is situated within the to-be-serviced pipeline end in a sealing attachment. A retainer or anchor of some sort must then be secured between the plug and a fixed object to prevent the vacuum drawing plug down the pipeline mentioned above. Thereafter, in a typical operation, a precision cut is made upon the pipe and the cut portion is removed leaving a precision edge. It is important that the pipeline plug be compatible with the cutting and removal of this additional piece.

The continuing need for pipeline operations safety has prompted practitioners in the art to provide various structures for temporary plugging of pipelines. U.S. Pat. No. 4,658,860 issued to Reaux sets forth a PRESSURE SET AND RETRIEVABLE VENTED ANCHOR-SEAL FOR PIPELINE SERVICE in which a temporary plug includes an anchor and seal which are simultaneously operable and actuated by remote pressure application to ensure securement of the temporary plug while work is undertaken. A pressure test plug and valve are coupled to the plug to determine pressure and release pressure prior to tool removal. Anchor means are retractably supported upon the plug and configured to engage the pipeline to resist movement of the plug within the pipeline.

U.S. Pat. No. 3,503,424 issued to Sawyer sets forth a PIPELINE PLUGGING PIG AND METHOD FOR TEMPORARILY PLUGGING PIPELINES in which an elongated generally cylindrical pipeline plug includes an inflatable resilient seal together with mechanical anchoring means which cooperate with a plurality of inwardly extending pins secured within the interior of the pipeline passage.

U.S. Pat. No. 3,495,626 issued to Nagel sets forth PIPELINE PLUGGING APPARATUS AND METHODS in which a temporary pipeline plug is movable through the pipeline under propulsion of the fluid product within the line. The plugging apparatus is operated by transmitting signals through the pipeline walls to provide stopping, sealing and bypass venting functions. A plurality of plugging and sealing systems are shown which cooperate with the transmission and reception of control signals to provide the movable plugging function.

U.S. Pat. No. 3,902,528 issued to Tartabini, et al. sets forth a PNEUMATIC PLUG FOR HYDRAULIC CONDUITS in which a tubular metal mandrel and longitudinally coextensive external elastomeric sleeve bonded thereto provide a low cost inflatable element which may be used to provide an air pressurized seal within a hydraulic pipeline.

U.S. Pat. No. 3,746,300 issued to Welker sets forth a FLOW REGULATOR for a pipeline or the like which includes a plug of resilient material. The plug is expanded and bulges on its outer surface to provide a sealing action within the interior passage of a pipeline. A plurality of ribs on the downstream portion of the expandable plugs are secured to an encircling rib and are operative to control and limit the shape of the expandable plug to maintain sealing action.

While the foregoing described prior art devices have provided some measure of operability in pipeline systems maintenance and repair activities, there remains a continuing need for evermore reliable and safe temporary pipeline plugs throughout the pipeline industries.

SUMMARY OF THE INVENTION

Accordingly, it is a general object of the present invention to provide an improved temporary pipeline plug. It is a more particular object of the present invention to provide an improved temporary pipeline plug which provides a reliable seal and anchor mechanism. It is a still more particular object of the present invention to provide an improved temporary pipeline plug which readily accommodates the removal of an end cutting piece during pipeline repair or modification.

In accordance with the present invention, there is provided for use in forming a temporary closure and seal of a pipeline end, a pipeline plug comprises: an elongated support shaft having first and second ends; an expandable seal supported at the first end; an anchor supported at the second end; means for expanding the expandable seal from the second end; and an intermediate support coupled to the support shaft between the first and second ends.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
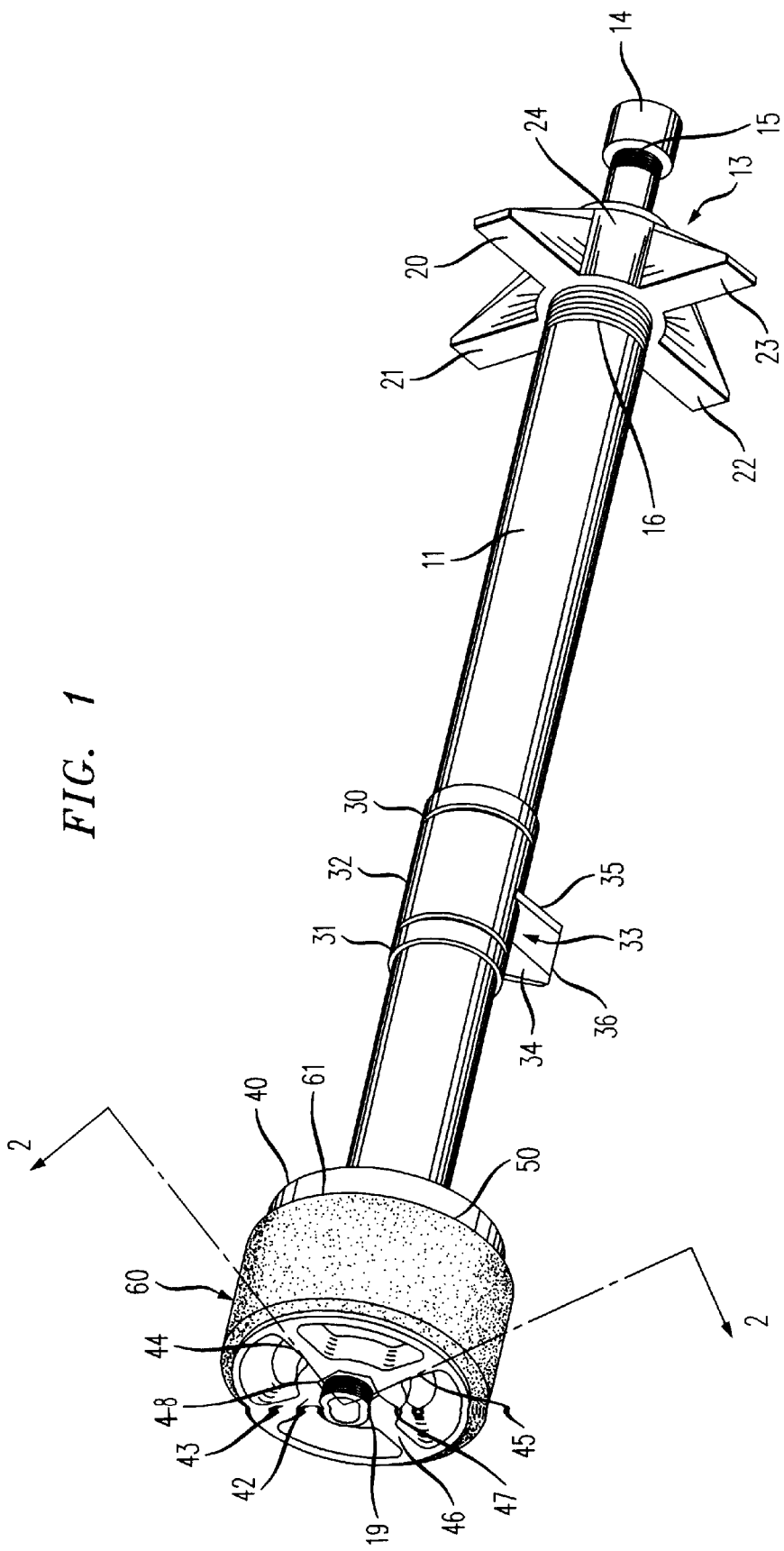
FIG. 1 sets forth a perspective view of a temporary pipeline plug constructed in accordance with the present invention.

FIG. 1 sets forth a perspective view of a pipeline plug constructed in accordance with the present invention and generally referenced by numeral 10. Plug 10 includes an elongated cylindrical outer shaft 11 defining a plurality of threads 16 at one end and a plurality of threads 17 at the other end (better seen in FIG. 2). As is also better seen in FIG. 2, outer shaft 11 defines a center passage 18 extending between threaded ends 17 and 16. A cylindrical sleeve 32 is loosely supported upon outer shaft 11 and further supports a downwardly extending shoe plate 33. Shoe plate 33 is secured to the outer surface of sleeve 32 and is formed by a pair of generally rectangular flanges 34 and 35 defining a cruciform structure and having a common end 36. In accordance with an important aspect of the present invention, sleeve 32 is freely rotatable about the outer surface of outer shaft 11 and thus the weight provided by shoe plate 33 causes sleeve 32 to automatically assume a position when pipeline plug 10 is generally horizontal in which end 36 extends downwardly in a vertical direction. The lateral position of sleeve 32 is maintained at the position shown on outer shaft 11 by a pair of containment rings 30 and 31. Rings 30 and 31 may be secured to outer shaft 11 using any convenient attachment means. However, it has been found convenient and advantageous to weld rings 30 and 31 to outer shaft 11 in the manner better seen in FIG. 2.

A cruciform anchor 13 defines a central threaded body 24 having a plurality of internal threads 25 and a plurality of radially extending spoke members 20, 21, 22 and 23. Internal threads 25 cooperate with threads 16 on outer shaft 11 to threadably secure anchor 13 to outer shaft 11. The position of anchor 13 upon outer shaft 11 is adjustable by rotation of anchor 13 with respect to threads 16.

An elongated generally cylindrical inner shaft 12 defines a threaded end 15 supporting a threaded cap 14 and extends through center passage 18 of outer shaft 11 and terminates at its forward end in a threaded end 19. While a variety of materials may be used to fabricate inner shaft 12, it has been found advantageous to fabricate shaft 12 from a strong metal such as steel or the like.

Pipeline plug 10 further includes a front pressure plate 41 and a rear pressure plate 40. Rear pressure plate 40 defines a generally cylindrical member having a plurality of internal threads 51 (better seen in FIG. 2) which permit pressure plate 40 to be threadably supported upon outer shaft 11. Pressure plate 40 further defines an angle surface 49. Front pressure plate 41 defines a generally cylindrical member having a central hub 42 defining a hexagonal recess 47 and a plurality of outwardly extending support webs 43, 44, 45 and 46. Front pressure plate 41 further defines an angled surface 49. A hexagonal nut 48, constructed in accordance with conventional fabrication techniques, is received within recess 47 and threadably engages threads 19 of inner shaft 12 to secure pressure plate 41 to inner shaft 12. A seal ring 60, preferably formed of a resilient sealing material such as plastic or rubber compositions, is captivated between pressure plates 40 and 41 and defines a generally cylindrical outer surface 61.

In accordance with an important aspect of the present invention, the diameter of outside surface 61 of seal ring 60 is slightly greater than the diameters of pressure plates 40 and 41. In addition, the diameter of seal ring 60 is selected to be slightly smaller than the internal dimension of the to-be-sealed pipeline within which pipeline plug 10 is to be installed. Correspondingly, and for reasons set forth below in greater detail, the extension of end 36 of shoe plate 33 from the center lines of outer shaft 11 and inner shaft 12 is selected to generally correspond to the diameter of seal ring 60 and to be slightly less or equal to the interior radius of the to-be-sealed pipeline within which plug 10 is to be installed. In addition, and as is also set forth below in greater detail, the radial extension of spokes 20 through 23 of anchor 13 is selected to be substantially greater than the outer diameter of the pipeline within which plug 10 is to be installed.

Figure 2:
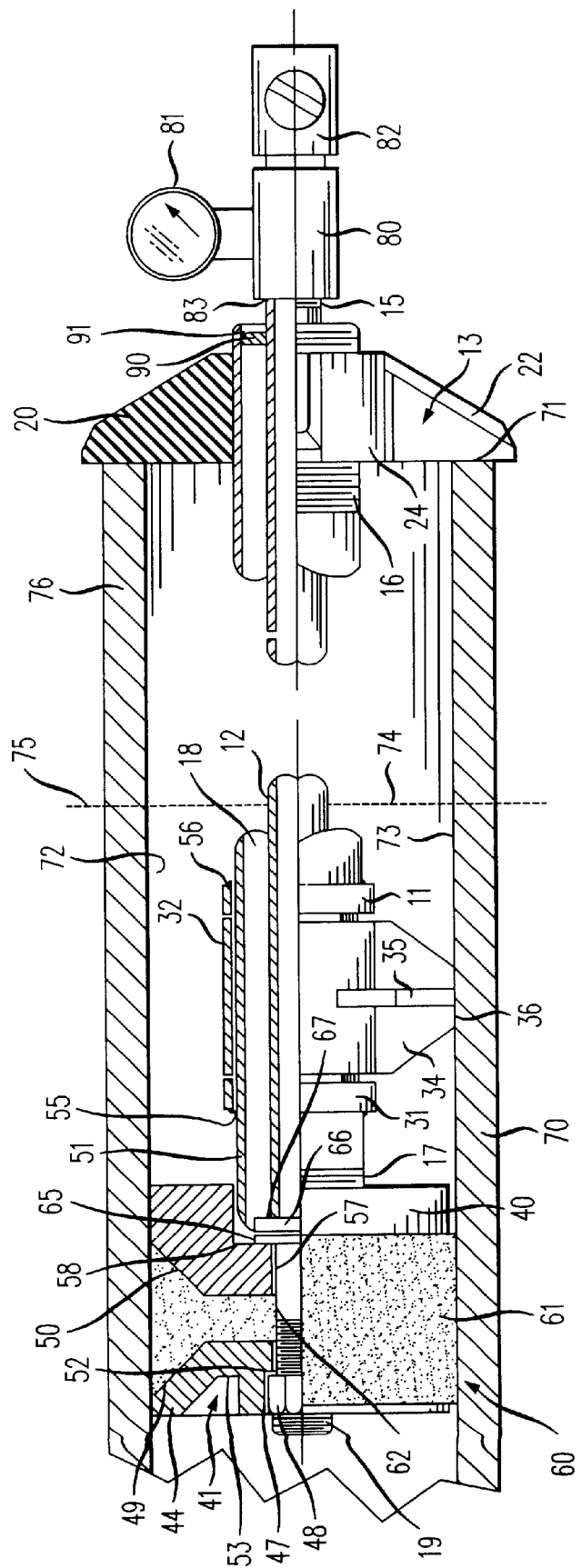
FIG. 2 sets forth a section view of the present invention temporary pipeline plug taken along section lines 2—2 in FIG. 1.
Figure 3:
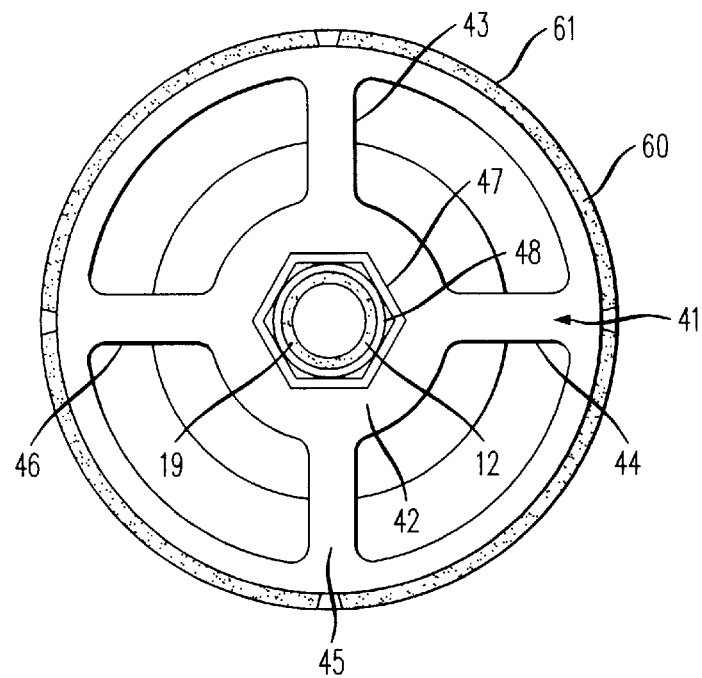
FIG. 3 sets forth a front view of the present invention temporary pipeline plug.

In its anticipated operation, plug 10 is inserted into the open end of the to-be-sealed pipeline in the manner shown in FIG. 3. During such installation and in accordance with the present invention, seal ring 60 is received within the interior pipe passage and end 36 is close to or in contact with the underlying portion of the to-be-sealed pipe. To provide the desired anchoring of plug 10 within the pipeline, spokes 20 through 23 are positioned against the end portion of the open pipe. Thereafter, in accordance with an important aspect of the present invention, inner shaft 12 is turned using a conventional pipe wrench or the like causing shaft 12 to rotate with respect to shaft 11. The rotation of inner shaft 12 causes threads 19 on the interior end thereof to be advanced within nut 48. The advancement of nut 48 and threads 19 decreases the distance between front pressure plate 41 and rear pressure plate 40. The decreased distance between pressure plates 40 and 41 forces seal ring 60 outwardly compressing outer surface 61 against the interior surface of the pipeline. As inner shaft 12 is further rotated, the compressive force upon seal ring 60 compresses outer surface 61 within the to-be-sealed pipeline producing an effective gastight seal. Once the seal is completed, the position of anchor 13 may be adjusted by rotation to provide the desired contact against the end portion of the to-be-sealed pipe. As a final step, cap 14 may be removed and threads 15 utilized to secure a conventional valve and pressure indicator in the manner shown in FIG. 2. The advantages of the present invention pipeline plug will be described below further in conjunction with FIG. 2. However, suffice it to note here that anchor 13 provides a reliable attachment for assuring that plug 10 is not drawn into the sealed pipeline despite the occurrence of substantial vacuum within the line. In addition, it should also be noted that the above-described free rotation of sleeve 32 and the gravitational action upon shoe plate 33 provide automatic alignment of shoe plate 33 beneath sleeve 32. As is described below in greater detail, this alignment permits shoe plate 33 to provide an additional support for pipeline plug 10 despite lateral forces applied to outer shaft 11 and inner shaft 12. Thus, the alignment of seal ring 60 within the pipeline interior is assured.

Once the operation to be performed upon the open pipeline end is completed, plug 10 is readily removed by simply rotating inner shaft 12 in the opposite direction used for installation which in turn separates pressure plates 40 and 41 and relaxes the compressive force upon seal ring 60 thereby releasing the seal of plug 10. Once the seal is released, plug 10 may be simply withdrawn from the pipeline end.

FIG. 2 sets forth a section view of pipeline plug 10 received within a typical open end pipe installation and taken along section lines 2—2 in FIG. 1. As described above, pipeline plug 10 includes a cylindrical outer shaft 11 defining a center passage 18 and threaded end portions 16 and 17. A cylindrical sleeve 32 is rotatable supported upon outer shaft 11 and supports a shoe plate 33 formed of a pair of flanges 34 and 35. Shoe plate 33 defines an end portion 36. A pair of cylindrical rings 30 and 31 are secured to outer shaft 11 on either side of sleeve 32 by conventional welding attachments 55 and 56.

An anchor 13 includes a threaded body 24 defining internal threads 25 which are received upon threads 16 of shaft 11. Anchor 13 further defines a plurality of outwardly extending spokes 20 through 23. A spacer 90 is secured within center passage 18 of outer shaft 11 and defines a center aperture 92 and is secured within center passage 18 by a conventional weld 91. An elongated cylindrical inner shaft 12 is received within center passage 18 and defines threaded end portions 15 and 19. Inner shaft 12 extends through aperture 92 of spacer 90 such that threaded end 15 extends beyond anchor 13. A conventional T-fitting 80 defines internal threads 83 which are received upon threads 15 of shaft 12. Threaded fitting 80 further supports a pressure gage 81 and a pressure valve 82. T-fitting 80, gage 81 and pressure valve 82 are constructed in accordance with conventional fabrication techniques.

A front pressure plate 41 defines a generally cylindrical surface having a center hub 42 and a plurality of outwardly extending webs 43 through 46. Front pressure plate 41 further defines a hexagonal recess 47 and a center aperture 53. A surface 52 extends between recess 47 and aperture 53. Pressure plate 41 further defines an angled surface 49. A rear pressure plate 40 includes a generally cylindrical member defining an angled surface 50 and a center aperture 57. Rear pressure plate 40 further defines a threaded recess 51 and a surface 58 extending between aperture 57 and threaded recess 51. A seal ring 60 formed of a resilient material such as rubber or plastic or the like defines a center aperture 62 and an outer surface 61. Seal ring 60 is configured to be received between pressure plates 40 and 41 in the manner shown in FIG. 2.

Inner shaft 12 extends through aperture 51 of rear pressure plate 40, aperture 62 of seal ring 60 and aperture 53 and recess 47 of front pressure plate 41. An annular pressure washer 66 is secured to shaft 12 by a conventional weld 67. A seal washer 65, preferably formed of a resilient material, is interposed between pressure washer 66 and surface 58 of pressure plate 40. A conventional hexagonal nut 48 is received within hexagonal recess 47 and threadably secured to threaded end 19 of shaft 12.

In the position shown in FIG. 2, pipeline plug 10 is received within the interior passage 72 of a typical pipeline open end 70. Pipeline end 70 defines a end portion 71 which, in the manner described above, is formed by the initial cutting of pipeline 70 to form an open end. Interior passage 72 of pipeline end portion 70 defines an inner surface 73. In accordance with the present invention and as described above, pipeline plug 10 is positioned within interior passage 72 in the manner shown in FIG. 2 such that shoe plate 33 extends downwardly and end 36 touches or is close to inner surface 73 of interior passage 72. The insertion of pipeline plug 10 positions outer surface 61 of seal ring 60 in contact with inner surface 73 of pipeline 70. In accordance with an important aspect of the present invention, pipeline plug 10 is inserted into interior passage 72 until end portion 72 is close to anchor 13. Thereafter, inner shaft 12 is rotated using a conventional pipe wrench or the like in the direction causing threaded end 19 of inner shaft 12 and nut 48 to cooperate to produce a compressive force against surfaces 52 and 58 of pressure plates 40 and 41. The compressive force applied to pressure plates 40 and 41 in turn compresses seal ring 60 therebetween while the action of angled surfaces 49 and 50 of plates 41 and 40 respectively forces outer surface 61 of seal ring 60 against inner surface 73 of pipeline end 70. This outward expansion of seal ring 60 provides the necessary seal between pipeline plug 10 and pipeline 70 to effectively seal pipeline 70. Once the desired seal has been established, the position of anchor 13 is adjusted by rotation of anchor 13 upon threads 16 of outer shaft 11 until spokes 20 through 23 are in contact with end portion 71 of pipeline 70.

In certain applications, it may be desirable to utilize pipeline plug 10 solely with cap 14 as shown in FIG. 1. However, in other applications, it may be desirable to utilize cap 14 during the above-described plug installation and thereafter remove cap 14 and secure T-fitting 80, pressure gage 81, and pressure valve 82 to threaded end 15 of shaft 12 in the manner shown in FIG. 2. The use of T-fitting 80, pressure gage 81 and pressure valve 82 has been found advantageous in most applications in that the pressure within pipeline 70 may be determined prior to removal of plug 10 in accordance with established safety procedures. It will be apparent those skilled in the art that virtually any combination of presently available T-fittings, pressure gages, and valves may be utilized to fulfill this function and meet this need.

With plug 10 installed within pipeline 70 in accordance with the above-described procedure, additional operations may be carried forward. For example, in a typical repair or system modification situation, a precision cut of the end portion of pipeline 70 will be undertaken to provide a precision cut line such as shown by dashed line 74. This precision cut will be performed to provide a new end portion 75 which more readily facilitates the reunion of pipeline 70 to the remainder of the system. The cutting along precision cut lines 74 which produces new end portion 75 also severs an intermediate section 76 from pipeline 70. In many operations, the cutting process along precision cut line 74 which severs intermediate section 76 from pipeline 70 may inadvertently permit intermediate section 76 to drop or fall upon the sealing plug. In some cases, the dropping of intermediate section 76 has been found to twist or tilt or otherwise angularly move the sealing plug and disturb the gastight seal within the pipeline end thereby creating a potentially dangerous gas leak at a critical moment of the pipeline operation. In accordance with an important aspect of the present invention, the angular position of pipeline plug 10 within pipeline 70 is maintained by the support provided by shoe plate 33 within interior passage 72. In essence, the automatic alignment of shoe plate 33 to the downwardly extending position shown in FIG. 2 assures that end portion 36 is at or near contact with inner surface 73 of interior passage 72. Thus, angular disturbance or tilting of the position of pipeline plug 10 due to impact as intermediate section 76 drops downwardly at the end of the cutting process is precluded and intermediate section 76 may conveniently supported upon outer shaft 11.

Thereafter, once the precision cut along cut line 74 has been completed, pressure gage 81 may be examined and valve 82 may be operated to relieve pressure within pipeline 70 and permit the removal of pipeline plug 10. This removal is accomplished by simply rotating inner shaft 12 in the counterclockwise direction to relieve the drawing force between pressure plates 40 and 41 which in turn releases the outward expansion of seal ring 60 and permits the removal of pipeline plug 10.

FIG. 3 sets forth a front view of front pressure plate 41 and seal ring 60. As set forth above, seal ring 60 comprises a generally cylindrical resilient member defining an outer surface 61. Front pressure plate 41 defines a generally cylindrical member having a center hub 42 and a plurality of radially extending support webs 43 through 46. Hub 42 further defines a hexagonal recess 47 which receives a conventional hexagonal nut 48. Front pressure plate 41 is secured to inner shaft 12 by the threaded cooperation of threads 19 of shaft 12 and the internal threads of nut 48.

Figure 4:
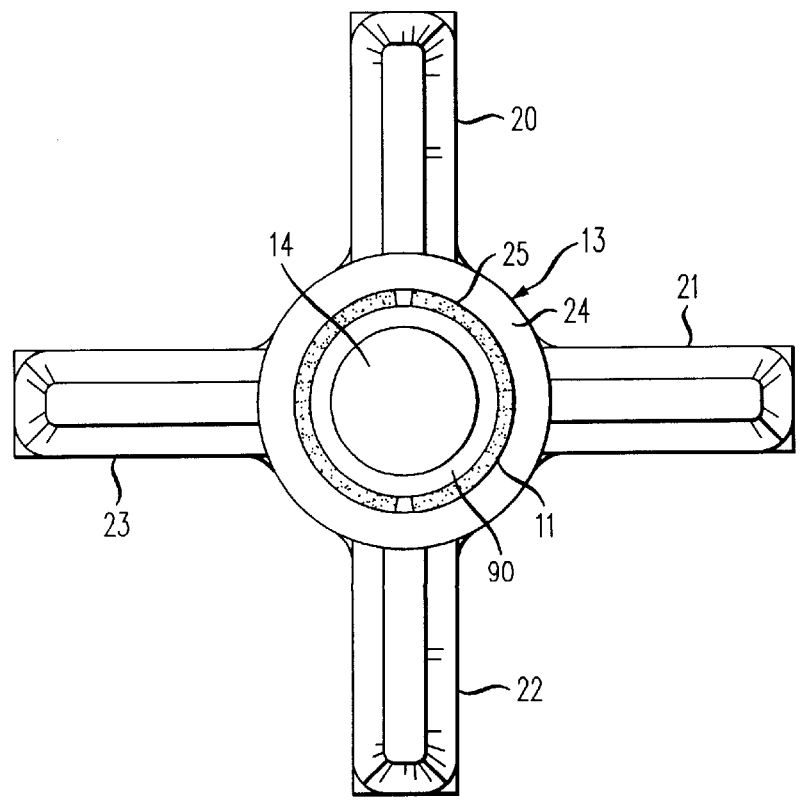
FIG. 4 sets forth a detailed view of the anchor portion of the present invention temporary pipeline plug.

FIG. 4 sets forth a rear view of anchor 13. As described above, anchor 13 defines a threaded body 24 which is generally cylindrical and defines a plurality of interior threads 25. Threaded body 24 is thus threadably received upon outer shaft 11 and supports an annular spacer 90. Anchor 13 further includes a plurality of outwardly extending spokes 20, 21, 22 and 23. As described above and as is better seen in FIG. 1, anchor 13 also receives the end portion of inner shaft 12 and cap 14.

What has been shown is a reliable and secure temporary pipeline plug which may be easily inserted into and secured within the open end of a pipeline system. The plug shown includes an integral anchor mechanism which precludes undesired movement of the plug into the open line in the presence of sudden vacuum situations. An expandable sealing mechanism is provided which reliably and securely seals the pipeline end while a rotatable shoe plate provides an intermediate support between the seal and anchor end to prevent inadvertent pressure release of the plug.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in forming a temporary closure and seal of a pipeline end defining an inner diameter, a major axis and an inner surface, a pipeline plug comprising:

an elongated support shaft having first and second ends;

an expandable seal supported at said first end;

an anchor larger than said inner diameter removably supported at said second end;

means for expanding said expandable seal from said second end;

an intermediate support coupled to said support shaft between said first and second ends having a portion contacting said pipeline at said inner surface to form a support for said elongated support shaft to maintain alignment of said support shaft and said major axis of said pipeline during and following removal of said anchor.

2. A pipeline as set forth in claim 1 wherein said intermediate support includes a gravity responsive member for orienting said intermediate support.

3. A pipeline plug as set forth in claim 2 wherein said anchor includes a center hub coupled to said second end and a plurality of radially extending spokes.

4. For use in forming a temporary closure and seal of a pipeline end defining an inner diameter, a major axis and an inner surface, a pipeline plug comprising:

a first shaft having a first internal passage and first and second ends;

a second shaft received within said first internal passage and having third and fourth ends;

an expandable seal coupled to said first and third ends of said first and second shafts respectively, said seal expanding in response to relative rotation between said first and second shafts in one direction and contracting in response to counter rotation;

an anchor removably coupled to said first shaft, said anchor being too large to be received within said pipeline end; and an intermediate support coupled to said first shaft between said first and second ends having a portion contacting said pipeline at said inner surface to form a support for said elongated support shaft to maintain alignment of said support shaft and said major axis of said pipeline during and following removal of said anchor.

5. A pipeline plug as set forth in claim 4 wherein said intermediate support includes a sleeve rotatably supported upon said first shaft having an extending shoe plate, said shoe plate tending to point downwardly under the influence of gravity.

6. A pipeline plug as set forth in claim 5 wherein said expandable seal includes a first pressure plate coupled to said first end of said first shaft, a second pressure plate secured to said third end of said second shaft and a resilient seal member captivated between said first and second pressure plates.

* * * * *